(12) United States Patent
Towfighi

(10) Patent No.: US 10,352,058 B2
(45) Date of Patent: Jul. 16, 2019

(54) RIGID SUB STRUCTURE DAMPING SYSTEM AND METHOD FOR PROTECTING STRUCTURES SUBJECTED TO DYNAMIC FORCES

(71) Applicant: Saeed Towfighi, Tucson, AZ (US)

(72) Inventor: Saeed Towfighi, Tucson, AZ (US)

(*) Notice: Subject to any disclaimer, the term of this patent is extended or adjusted under 35 U.S.C. 154(b) by 0 days.

(21) Appl. No.: 15/898,879

(22) Filed: Feb. 19, 2018

(65) Prior Publication Data

US 2018/0334824 A1    Nov. 22, 2018

Related U.S. Application Data

(60) Provisional application No. 62/507,617, filed on May 17, 2017.

(51) Int. Cl.

| | | |
|---|---|---|
| *E04H 9/02* | (2006.01) |
| *E04B 1/98* | (2006.01) |
| *F16F 9/22* | (2006.01) |
| *F16F 15/027* | (2006.01) |
| *E02D 27/34* | (2006.01) |
| *E04B 1/18* | (2006.01) |
| *E04B 1/36* | (2006.01) |

(52) U.S. Cl.
CPC .............. *E04H 9/029* (2013.01); *E02D 27/34* (2013.01); *E04B 1/18* (2013.01); *E04B 1/36* (2013.01); *E04B 1/98* (2013.01); *E04B 1/985* (2013.01); *E04H 9/021* (2013.01); *F16F 9/22* (2013.01); *F16F 15/0275* (2013.01); *E04H 9/024* (2013.01); *E04H 9/025* (2013.01); *E04H 2009/026* (2013.01)

(58) Field of Classification Search
CPC ......... E04H 9/021; E04H 9/024; E04H 9/025; E04B 1/18; E04B 1/36; E04B 1/985
See application file for complete search history.

(56) References Cited

U.S. PATENT DOCUMENTS

| | | | | |
|---|---|---|---|---|
| 3,418,768 A * | 12/1968 | Cardan | ..................... | E04H 9/02 188/312 |
| 4,922,667 A * | 5/1990 | Kobori | ..................... | E02D 27/34 52/167.2 |
| 5,036,633 A * | 8/1991 | Kobori | ..................... | E04H 9/02 52/1 |
| 5,271,197 A * | 12/1993 | Uno | .......................... | E04H 9/02 52/167.1 |
| 6,256,943 B1 * | 7/2001 | Mander | .................... | E04H 9/02 52/146 |

(Continued)

*Primary Examiner* — Joshua K Ihezie
(74) *Attorney, Agent, or Firm* — Arjomand Law Group

(57) ABSTRACT

A rigid substructure (12) tied to a restrained column (16) at different floors undergoes rigid body rotation due to lateral dynamic loading. Flexural members (18) that are connected to the substructure (12) and another anchor column (14) resist the rigid body rotation and undergo vertical deflections. Damped diagonals (20) connected to common nodes of the rigid substructure and flexural members, for one embodiment, receive amplified displacements and more effectively dissipate energy. Flexural members restore the structure to the unloaded position. The system does not require moment connections and can work with flexure induced in simply supported beams. The system is highly effective and may remain elastic under maximum considered earthquake ground motions.

9 Claims, 12 Drawing Sheets

(56) References Cited

U.S. PATENT DOCUMENTS 6,397,528 B1 *   6/2002   Rahimian ................ E04H 9/02
                                                       52/167.1
9,080,339 B2 *   7/2015   Hayes ...................... F16B 7/00

* cited by examiner

| Damper Type | Span Between Columns (ft) | | | | | Height (ft) |
|---|---|---|---|---|---|---|
| | 20 | 25 | 30 | 35 | 40 | |
| DIAG | 0.91 | 0.94 | 0.96 | 0.97 | 0.98 | 9 |
| CHV1 | 0.74 | 0.81 | 0.86 | 0.89 | 0.91 | |
| CHV2 | 1 | 1 | 1 | 1 | 1 | |
| DRS1 | 1.49 | 1.62 | 1.71 | 1.78 | 1.82 | |
| DRS2 | 1.77 | 2.02 | 2.21 | 2.35 | 2.45 | |
| DIAG | 0.89 | 0.93 | 0.95 | 0.96 | 0.97 | 10 |
| CHV1 | 0.71 | 0.78 | 0.83 | 0.87 | 0.89 | |
| CHV2 | 1 | 1 | 1 | 1 | 1 | |
| DRS1 | 1.41 | 1.56 | 1.66 | 1.74 | 1.79 | |
| DRS2 | 1.65 | 1.9 | 2.1 | 2.25 | 2.37 | |
| DIAG | 0.88 | 0.92 | 0.94 | 0.95 | 0.96 | 11 |
| CHV1 | 0.67 | 0.75 | 0.81 | 0.85 | 0.88 | |
| CHV2 | 1 | 1 | 1 | 1 | 1 | |
| DRS1 | 1.35 | 1.5 | 1.61 | 1.69 | 1.75 | |
| DRS2 | 1.55 | 1.8 | 2 | 2.16 | 2.29 | |
| DIAG | 0.86 | 0.9 | 0.93 | 0.95 | 0.96 | 12 |
| CHV1 | 0.64 | 0.72 | 0.78 | 0.82 | 0.86 | |
| CHV2 | 1 | 1 | 1 | 1 | 1 | |
| DRS1 | 1.28 | 1.44 | 1.56 | 1.65 | 1.71 | |
| DRS2 | 1.45 | 1.7 | 1.9 | 2.07 | 2.21 | |
| DIAG | 0.84 | 0.89 | 0.92 | 0.94 | 0.95 | 13 |
| CHV1 | 0.61 | 0.69 | 0.76 | 0.8 | 0.84 | |
| CHV2 | 1 | 1 | 1 | 1 | 1 | |
| DRS1 | 1.22 | 1.39 | 1.51 | 1.61 | 1.68 | |
| DRS2 | 1.36 | 1.61 | 1.82 | 1.99 | 2.13 | |

Fig. 8

| Ground Motion | LA02 | LA09 | LA12 | LA14 | LA18 | Avg. |
|---|---|---|---|---|---|---|
| Roof Displacement, mm | 118 | 185 | 81 | 215 | 256 | 171 |
| Total Drift | 0.005 | 0.008 | 0.003 | 0.009 | 0.010 | 0.007 |
| Ground Acceleration, m/s² | 6.63 | 5.10 | 9.51 | 6.45 | 8.02 | 7.14 |
| Roof Absolute Acceleration, m/s2 | 4.83 | 6.45 | 4.96 | 7.24 | 7.85 | 6.27 |
| Equivalent Damping | 45% | 51% | 41% | 31% | 32% | 40% |
| Elastic Base Shear, without dampers, % of W | 41% | 104% | 32% | 70% | 84% | 66% |
| Base Shear with Dampers, % of W | 16% | 37% | 16% | 33% | 41% | 28% |

Fig. 9i

RIGID SUB STRUCTURE DAMPING SYSTEM AND METHOD FOR PROTECTING STRUCTURES SUBJECTED TO DYNAMIC FORCES

CROSS-REFERENCE TO RELATED APPLICATION

This application claims priority of U.S. provisional application No. 62/507,617, filed May 17, 2017.

BACKGROUND

This disclosure generally relates to a system and method for protecting large structures, such as low-rise and high-rise buildings, subjected to dynamic forces, such as earthquakes, and winds, and more particularly, for efficiently and economically increasing the capability of such structures to withstand dynamic forces by partially dissipating the input energy from the structural system through usage of dampers.

Supplemental damping has been used for improving the response of building structures subjected to dynamic loadings. Dampers dissipate energy from a structural system by receiving displacement or velocity between two points of a structure. For more effective usage of dampers, designers have amplified the displacements or velocities that activate the dampers through amplification mechanisms or simply by finding installation points that have larger relative displacements or velocities. U.S. Pat. No. 5,934,028A, titled "Toggle linkage seismic isolation structure", is an example of a magnification mechanism. Increasing the displacement of a damper reduces the force exerted to the damper which reduces the cost for a viscous damper. However, usage of this system has been limited and implementation of the system in practice is expensive. Another invention that amplifies displacements with the addition of a mechanism is disclosed in the U.S. Pat. No. 6,438,905B2, titled "Highly effective seismic energy dissipation apparatus". This system includes a complex mechanical magnification system that is connected from one end to a point on a beam. The flexibility of the beam can reduce the effectiveness of the system due to its deflection. U.S. Pat. No. 6,397,528B1, titled "Coupled truss systems with damping for seismic protection of buildings", uses dampers between two vertically braced bays to take advantage of opposite axial deformations in the columns of the middle bay. Therefore the displacement of a damper installed in the inner bay is increased. This system is useful for tall buildings because in low-rise buildings vertical displacement of columns in a braced bay is small and cannot lead to effective usage of dampers. Limitation of usage only at the top of buildings and in combination with other stiff lateral elements such as bracing limits its performance. Another damping system that is aimed for high-rise buildings is disclosed in U.S. Pat. No. 9,163,424B2, titled "Viscous wall coupling damper". This system uses rotation of the core shear wall that mobilizes the outrigger arms to activate the dampers that are installed between the outrigger walls and columns. It includes complex detailing and can be used only in the outriggers of high-rise buildings. U.S. Pat. No. 6,233,884B1, titled "Method and apparatus to control seismic forces, accelerations, and displacements of structures" proposes separation of the gravity and lateral system with substantial stiffness difference and provides dampers activated by the displacement between the two systems. The separation between the gravity and lateral system is not feasible for most projects.

There is another group of methods that utilize the Base Isolation concept. All of these methods are significantly more expensive than the above-mentioned methods and are only used when importance of the building justifies the high construction and maintenance costs. However, the performance improvements are also significant. Allowance for large displacements above the base isolators can limit the usage of this system in addition to the costs and maintenance requirement of the isolators. US Patent No. 20130118098A1, titled "Negative stiffness device and method" is theoretically an advanced solution. However, the system is complex and requires a budget that is not available for many buildings in high seismic areas.

Review of different damping systems indicates that adjustment of the damping system with the stiffness of the structure is required for the efficiency of a damping system. Moment frames that can perform well with dampers generally consume more structural materials and are usually used when the architectural design does not allow bracing or shear walls. More rigid structures such as shear wall or bracing systems usually do not provide enough movement to activate dampers efficiently and require amplification mechanisms. Negative stiffness device is directly aimed at modification of the stiffness. Therefore an economical structural system for effective usage of dampers may require a suitably modified lateral system.

BRIEF DESCRIPTION OF THE FIGURES

The accompanying figures illustrate exemplary embodiments of the concepts that explain principles and behavior of those embodiments, also includes a numerical example that indicates significance of the usage of the system.

FIG. 8 Shows the improvement of the amplification effect compared with the prior art with two of the embodiments of this invention.

FIG. 9a through 9i show level of energy absorption and equivalent damping, achieved by implementation of one

DETAILED DESCRIPTION

Figure 1:
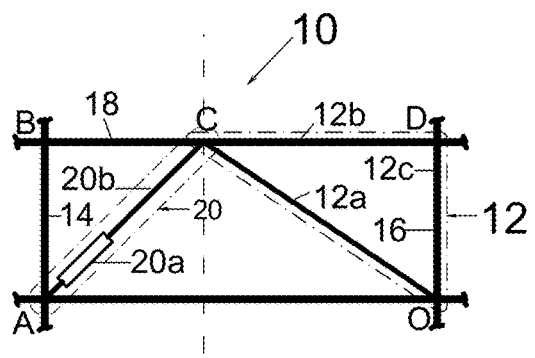
FIG. 1 and FIG. 1a show a simple rigid substructure 12, with dampers 20 and a flexural beam 18. Approximate formulas are provided for the deflection in the flexural member as well as the axial deformation of the damped diagonal.

One aspect of this disclosure is directed to a rigid substructure damping system for protecting large structures subjected to dynamic forces, such as earthquakes. The structure includes at least one rigid substructure that incorporates a segment of one and only one column that is directly supported by a foundation therefore prevented against vertical movement, referred to as "restrained column" hereinafter. The rigid substructure and the restrained column extend between two floors that are not necessarily consecutive. The method for providing rigidity to the substructure is known and as an example, it can be obtained by using elements forming a truss which can be composed of one or more triangles or it can be obtained by using solid walls with or without openings. Since the rigid substructure is integrated with the restrained column at least at the two levels, when dynamic forces create different lateral displacement at the floor levels, the restrained segment of the column tilts and the rigid substructure undergoes rigid body rotation. Having more than one restrained column in a planar rigid substructure should be avoided as it would prevent the rigid substructure motion as a rigid body. Nodal points on the rigid substructure at a distance from the constrained column would effectively undergo vertical displacements. These nodes are called "active nodes" in this text.

This system further includes another column which is different from the restrained column and is not directly connected to any node of the substructure, called an "anchor column" here that connects to floors at "anchor nodes". Anchor nodes are connection points on anchor columns for other members of the system and would receive vertical and horizontal force components. Therefore when anchor nodes are at floor levels can transfer the horizontal force component to the floor slab. However it is possible to consider anchor nodes between floors and design the anchor column for the horizontal force component.

This system further includes one or more flexural members such as beams and/or floor slabs, referred to as "flexural members", each connected to at least one active node and to an anchor node. Each of such flexural members can be extended to the restrained column and/or from the anchor column to another vertical support. Connection types used at the ends of the flexural members can be hinged or can have fixity, capable of transferring moments. The requirement for the continuity and connection types of a flexural member is that, due to vertical displacement of any of its active nodes, the flexural member be bent, resisting the vertical displacement of the active node. Therefore, a flexural member opposes the drift in the structure and exerts an internal stabilizing force to the system as the vertical displacement of the active node is tied to the lateral drift.

The system further includes one or more elongated damped diagonals each from the first end, operatively connected to an anchor node and from the second end connected to an active node of the system or any other node that moves in the vertical direction due to the deflection of a flexural member. Damped diagonals usually include a damper extension at least from one end to suit for installation or can be available as a Buckling Restrained Brace. The extensions and connections of the elongated damped diagonals are designed with adequate stiffness such that the damper or the energy dissipation segment receives a significant portion of the displacement between the two ends of the elongated damped diagonal for increased efficiency. Velocity-activated and/or displacement-activated dampers can be used.

Lateral stability of a multi-story building using the "rigid substructure damping system" follows the principles of using conventional bracing and moment frame systems. Also, instability of the structural system can be captured by computer programs capable of analysis of structures with dampers. Therefore principles of combining units of rigid substructure damping system for stabilizing a multi-story structure are known and need not be included here. Hence only different embodiments that can stabilize two or more floors with respect to each other in a particular direction are described in this text. In addition the computer programs capture the amplification effects and deflection of the flexural members of the system, therefore manual calculations are not necessary.

Figure 1A:
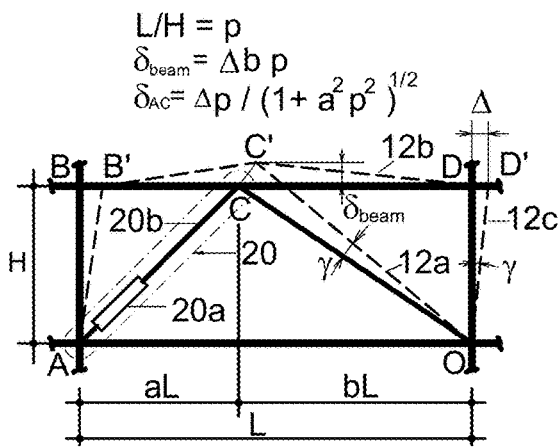

One embodiment is illustrated in FIG. 1. One anchor column 14 and one restrained column 16 are shown with three floor-beams. The rigid substructure 12 includes three elements that form a triangle to satisfy the rigidity requirement at nodal points. First element of the rigid substructure is a segment of column 12c, the restrained column, with two connectivity nodal points O and D at two consecutive floor levels, the second element is a segment of a beam 12b, as continuation of the flexural member 18, and the third element is a brace 12a, connected from one end to the nodal point of the restrained column O which is at a floor lower than the flexural beam, and from the other end to an active node C, in the middle of the flexural beam which is not necessarily at the center of the flexural beam. An elongated damped diagonal 20, is included that connects from one end to the only active node at the intersection of the flexural beam and the rigid substructure and to the nodal point of an anchor column not located at the level of the flexural beam. The rigid triangular substructure 12 slightly rotates due to the lateral drift which effectively moves the point C in the vertical direction. Flexural beam BCD is continuous at C and connected at B and D with simple shear connections to the columns. Vertical displacement of point C bends the beam and additionally increases the axial deformation and velocity in the damped diagonal. It is clear that the entire geometry can be reversed such that the flexural member would be at the lower side of the rigid substructure. In FIG. 1a, the embodiment of FIG. 1 is shown with parameters to calculate the deflection of the flexural beam and the axial displacement in the damped diagonal at the lower level. An approximate deformed shape can be depicted as shown with dashed lines. Formulas as an approximation are obtained for small displacement geometry and dimension-less parameters neglecting small axial deformation of the rigid substructure members. The deflection formula can be used for preliminary selection of flexural beam sizes. Axial deformation formula indicates amplification of the story relative displacement exerted to the damped diagonal 20. As depicted, the rigid body rotation of the substructure, $\gamma$, moves point C to a new location C'. Since the length of diagonal OC is larger than OD or the story height H, and rotation for both members is the same, CC' is larger than DD' which means diagonal AC would undergo amplified axial deformation, larger than the story drift times H. More accurate estimation of the axial deformation in the damper can be obtained using the formula provided in FIG. 1a. The amplification of the axial deformation in damped diagonals, as well as the imposed deflection in the flexural beam, can be captured in the mathematical models formed in computer programs for any configuration. However, it can be seen that the damped diagonal here would receive significantly larger axial deformations compared with prior art damped systems without mechanical magnification systems.

Figure 2:
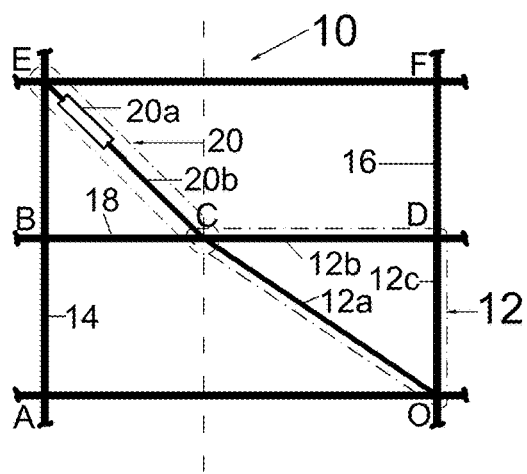
FIG. 2 and FIG. 2a show a rigid substructure 12 and a damped diagonal 20 installed at two consecutive floors.
Figure 2A:
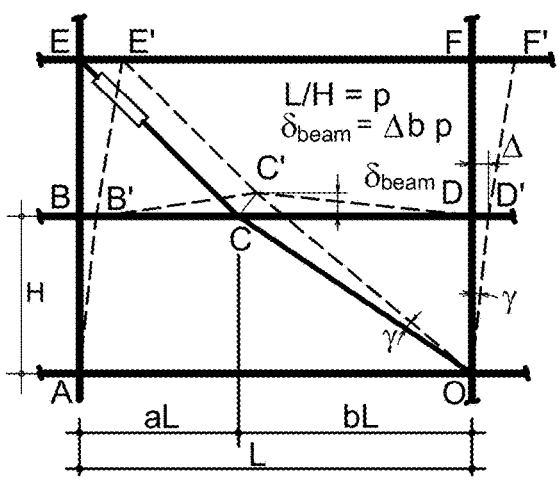

Another embodiment is shown in FIG. 2; the same as the embodiment in FIG. 1, except that the damped diagonal is connected to an anchor node at the third floor. For this configuration, the damped diagonal is effectively subjected to the axial deformation accumulation between the two stories. Also, the slight change of angle between OC and CE members as shown indicates a force magnification mechanism that can trigger sliding of the damper. The length difference between EC and E'C' indicates an amplified axial displacement in the damper.

Figure 3:
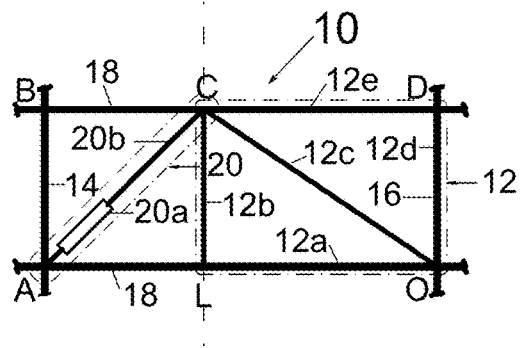
FIG. 3 and FIG. 3a show another embodiment of the invention wherein the rigid substructure 12 is a rectangle that employs two flexural beams for restoring the structure to its original unloaded position.
Figure 3A:
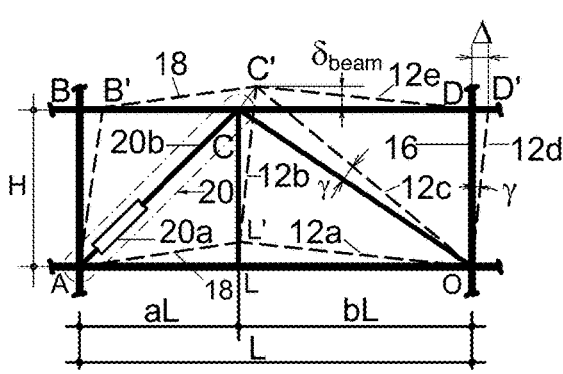

Another embodiment is shown in FIG. 3, same as the embodiment in FIG. 1, except that the rigid substructure further includes a vertical post 12b under active node C. This addition changes the rigid substructure 12 to the rectangle LCDO. FIG. 3a shows that rigid body rotation of LCDO effectively moves the active node L in addition to the active node C, imposing deflection in the flexural member ALO in addition to the upper flexural member BCD. For this configuration, restoring effect of the bending in the flexural members is increased due to the addition of the vertical post 12b which creates another active node on the flexural member ALO.

Figure 4:
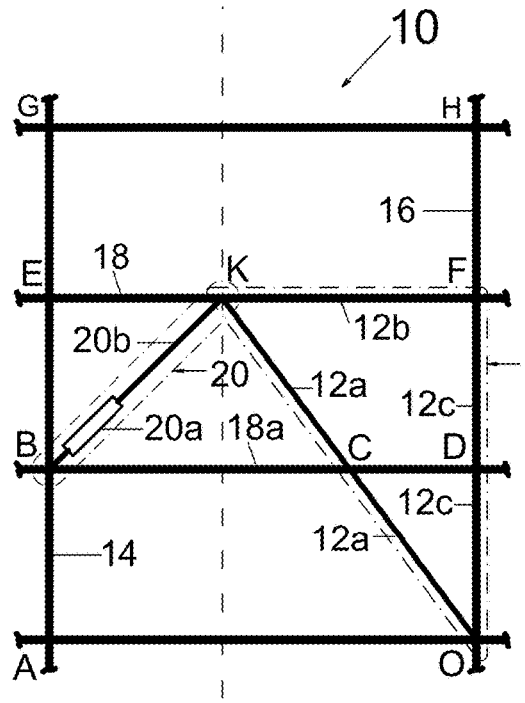
FIGS. 4, 4a, and 4b show another embodiment of the invention wherein the rigid substructure 12 is a triangle that is two stories tall.
Figure 4A:
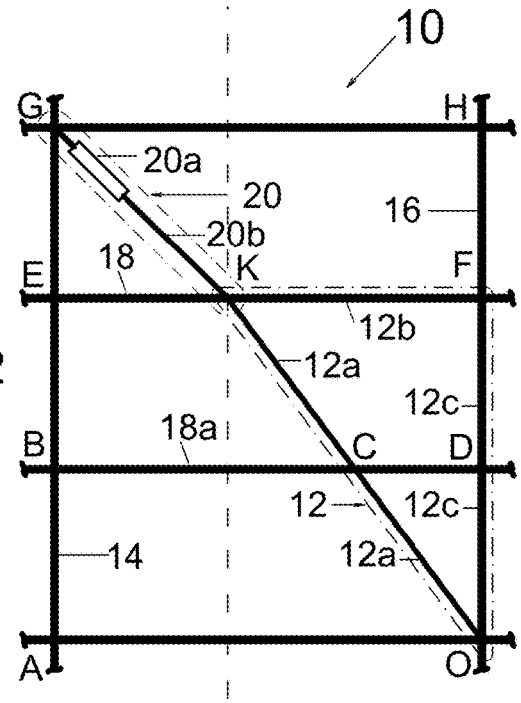
Figure 4B:
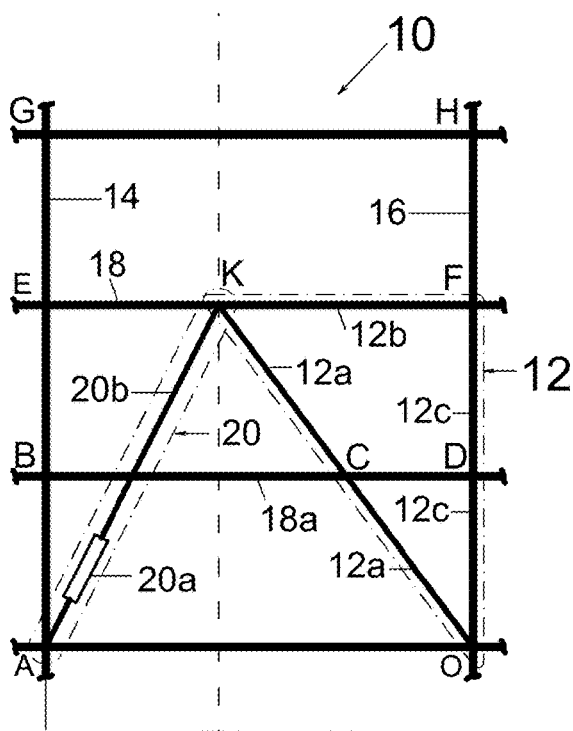

Another embodiment is shown in FIG. 4 wherein the undamped brace is connected to the intermediate floor flexural member and continued further to connect to the second floor flexural member. Two rigid substructures can be distinguished here, the triangle OCD and the larger triangle OKF. This configuration utilizes more flexural members. Different damped diagonals as shown would have different results however the different damped diagonal configurations show that numerous anchor nodes, i.e. A, B, E, and G can result in numerous installations for the damped diagonals.

Figure 5:
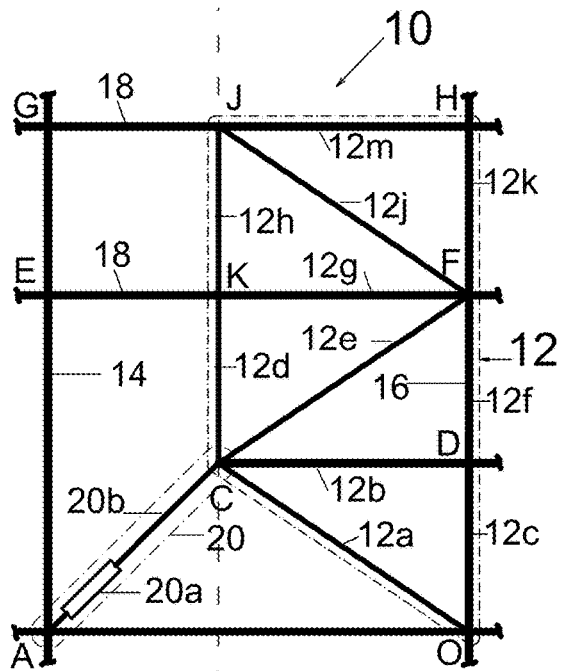
FIGS. 5, 5a, 5b and 5c show other embodiments of the invention where the rigid substructure 12 is connected to three stories, flexural members at two levels are used in the system and one damped diagonal 20 is used at different positions.
Figure 5A:
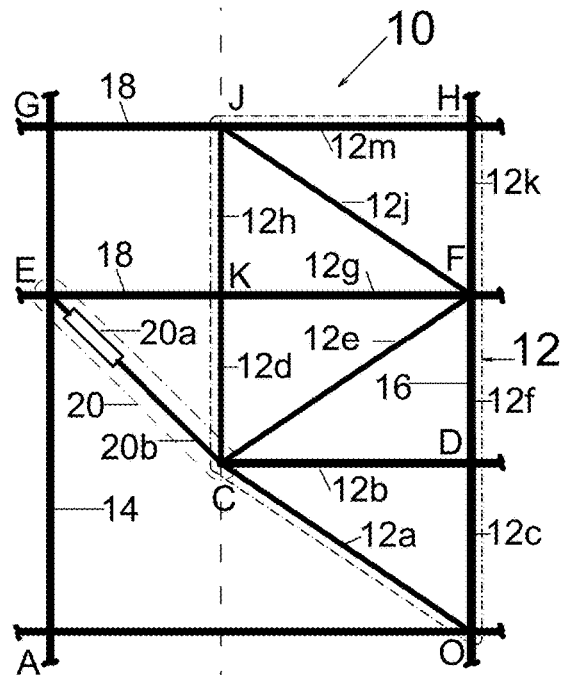
Figure 5B:
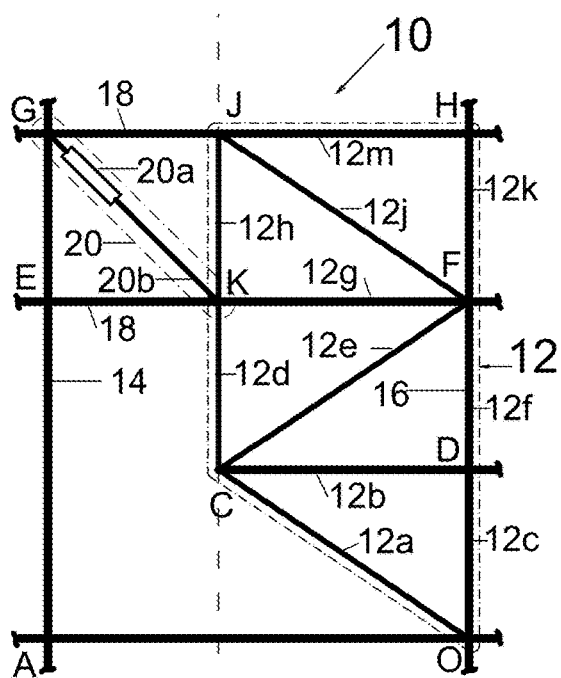
Figure 5C:
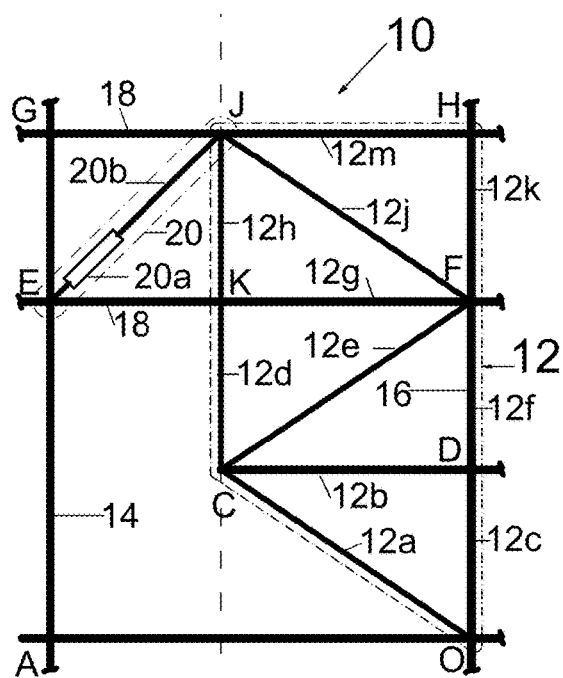

Another embodiment is shown in FIG. 5 where the rigid substructure 12 is a vertical truss. Members of the truss are labeled as 12a, 12b, to 12m. The flexural beams are at the upper two levels and continuously extended into the rigid substructure. Floor beams EF, and GH may be connected to columns 14 and 16 using simple shear connections only, without moment connection detailing. In this embodiment, only one damped diagonal is used at the lower level and connected to nodal point C. Some of the other locations where damped diagonals can be used are shown in FIGS. 5a to 5c.

Figure 6:
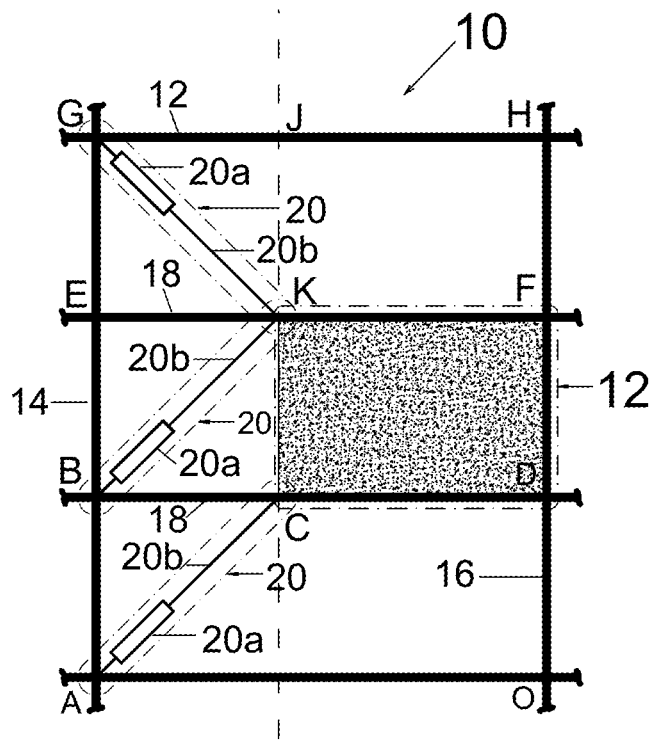
FIG. 6 shows another embodiment of the invention where the rigid substructure 12 is a reinforced concrete wall. Either one or two or all of the damped diagonals can be used.

Another embodiment is shown in FIG. 6 wherein the rigid substructure 12 is a concrete wall that would rotate as a rigid body due to the story drift at the middle floor. Only one of the damped diagonals is necessary, however, structural results would be different when damped diagonals are placed at different floors or if only two or the three of those were used.

Figure 7:
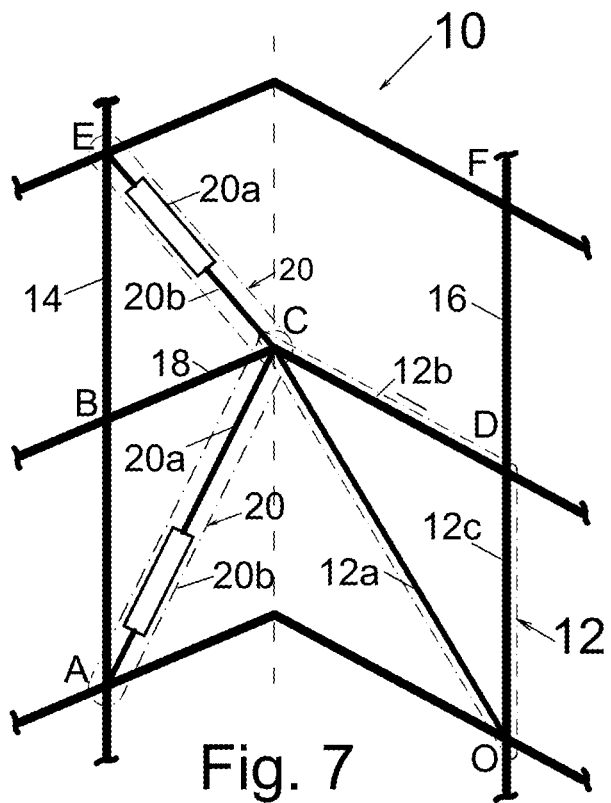
FIG. 7 shows another embodiment of the invention where the rigid substructure and the damped diagonals are located in different vertical planes. Either one or both of the damped diagonals can be used.

Another embodiment is shown in FIG. 7 where the rigid substructure is in a vertical plane which is different from the vertical plane of the flexural beam and the damped diagonals. The two planes can be oriented to intersect at any angle. This embodiment can be arranged at intersection of walls. The flexural beam 18, in this case, can be extended beyond column 14 with a back span or at least connected to the column 14 with a connection capable of transferring moment such that vertical displacement of the active node of the flexural beam creates moment in the flexural beam.

FIG. 8 approximately shows a comparison between the relative story displacements that the damped diagonal would receive for different simple configurations that can be found in the prior art. This comparison is limited because amplification is one aspect of the advantage of using this system.

Figure 9A:
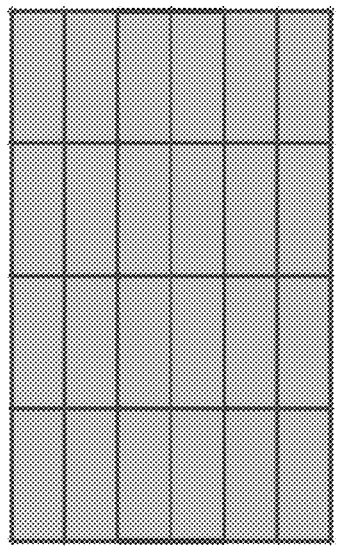
Figure 9B:
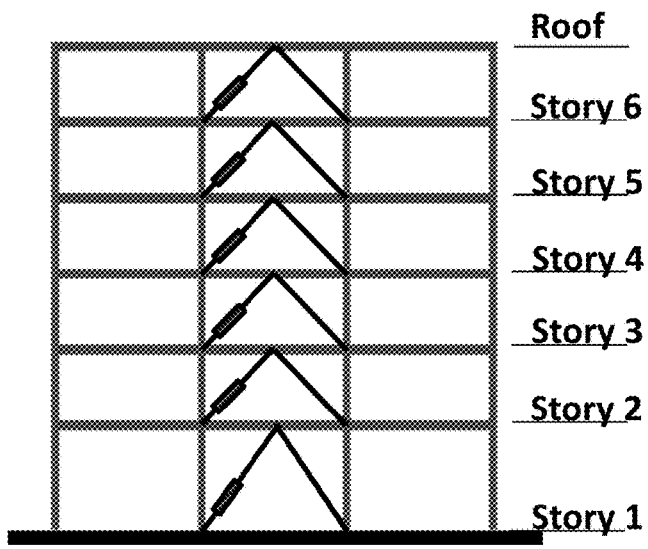
Figure 9C:
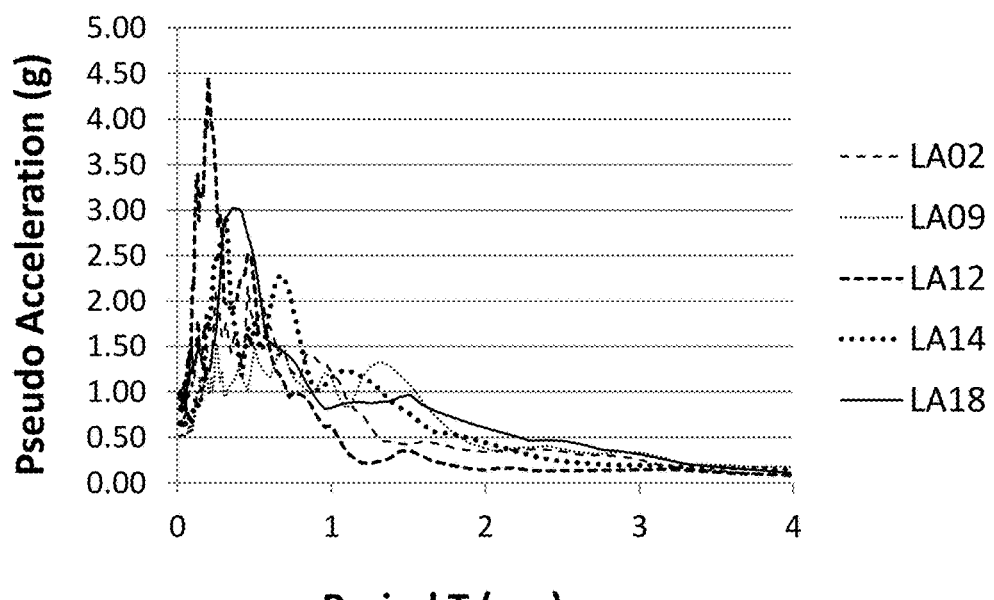
Figure 9D:
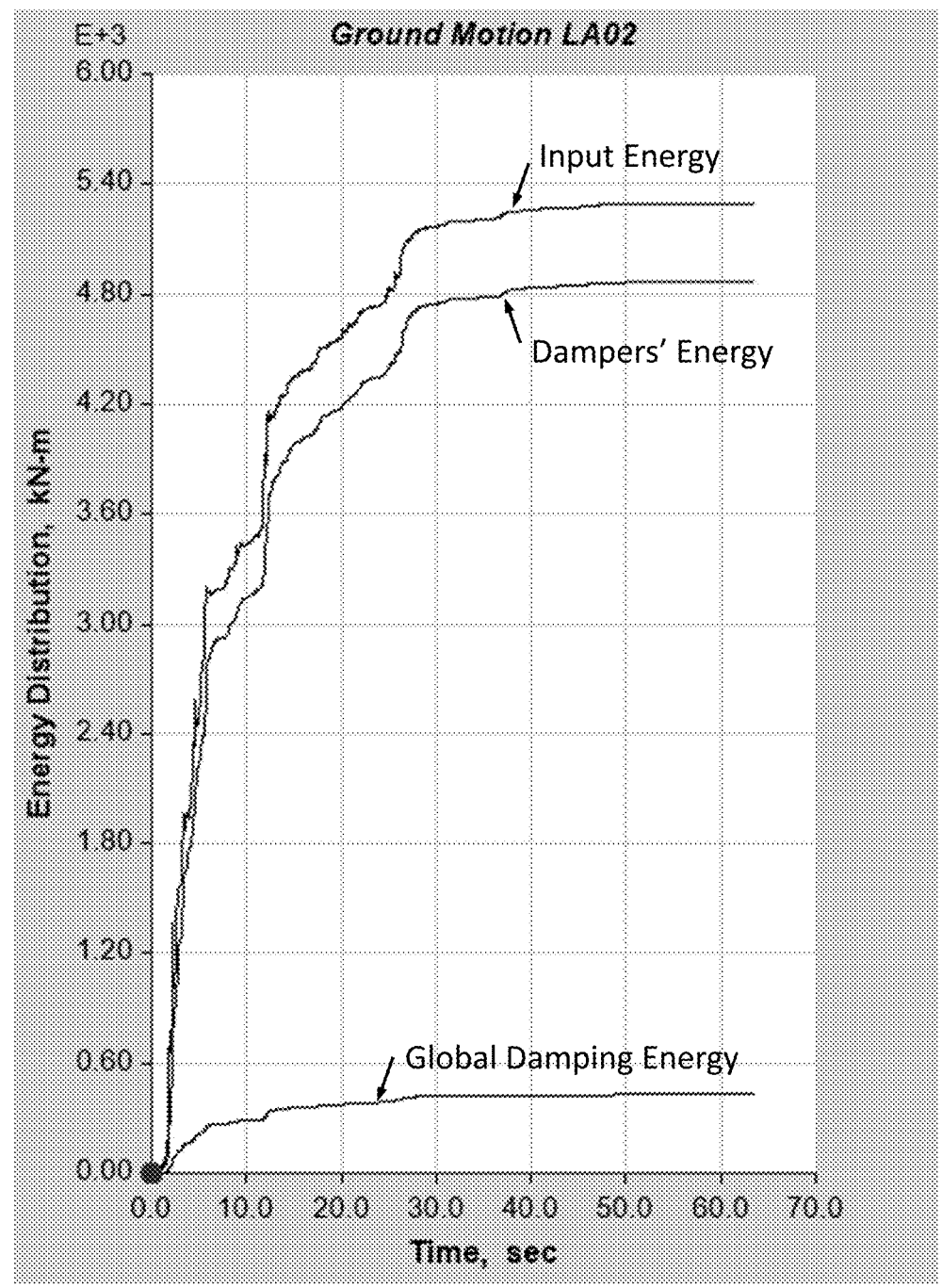
Figure 9E:
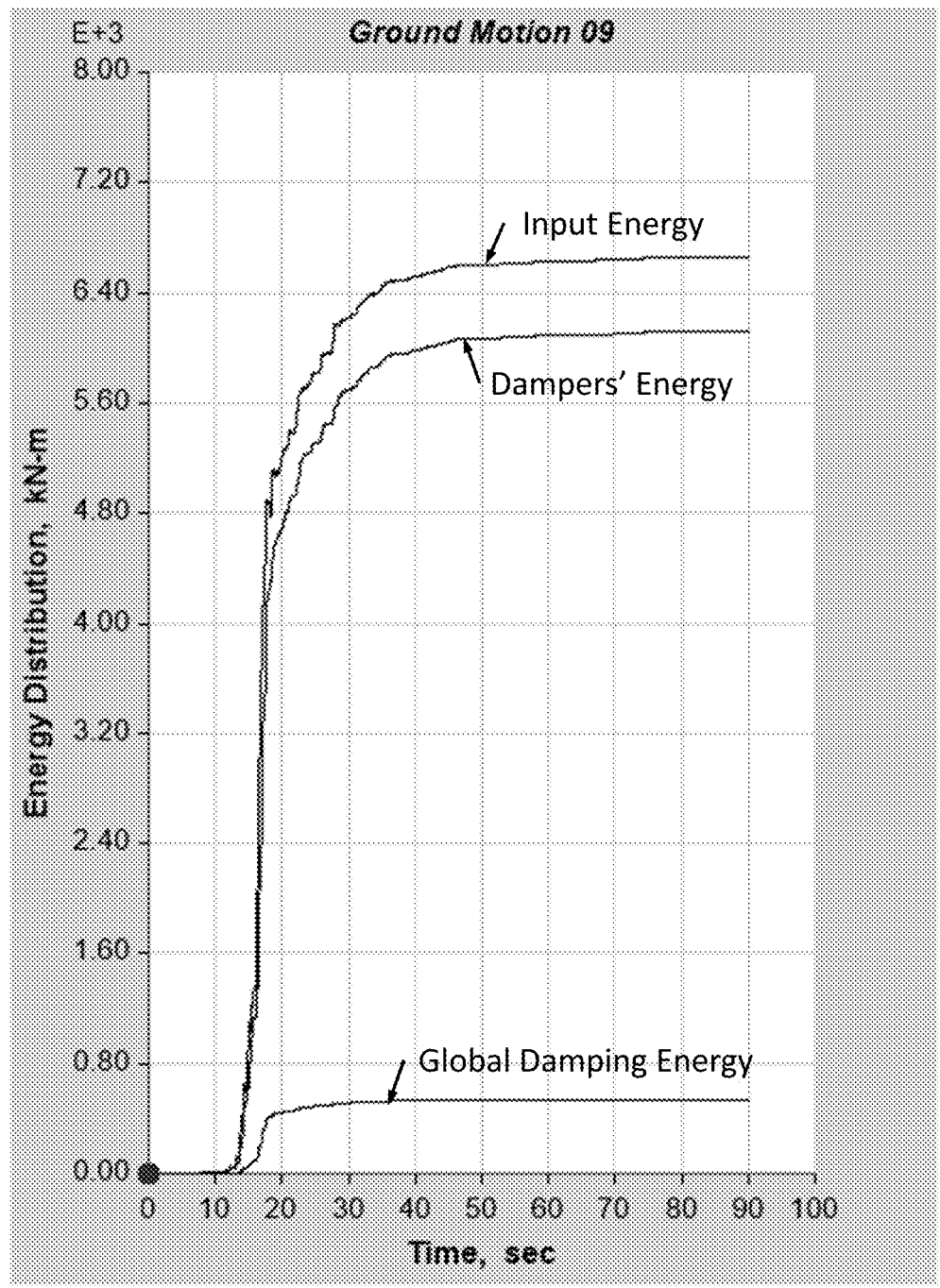
Figure 9F:
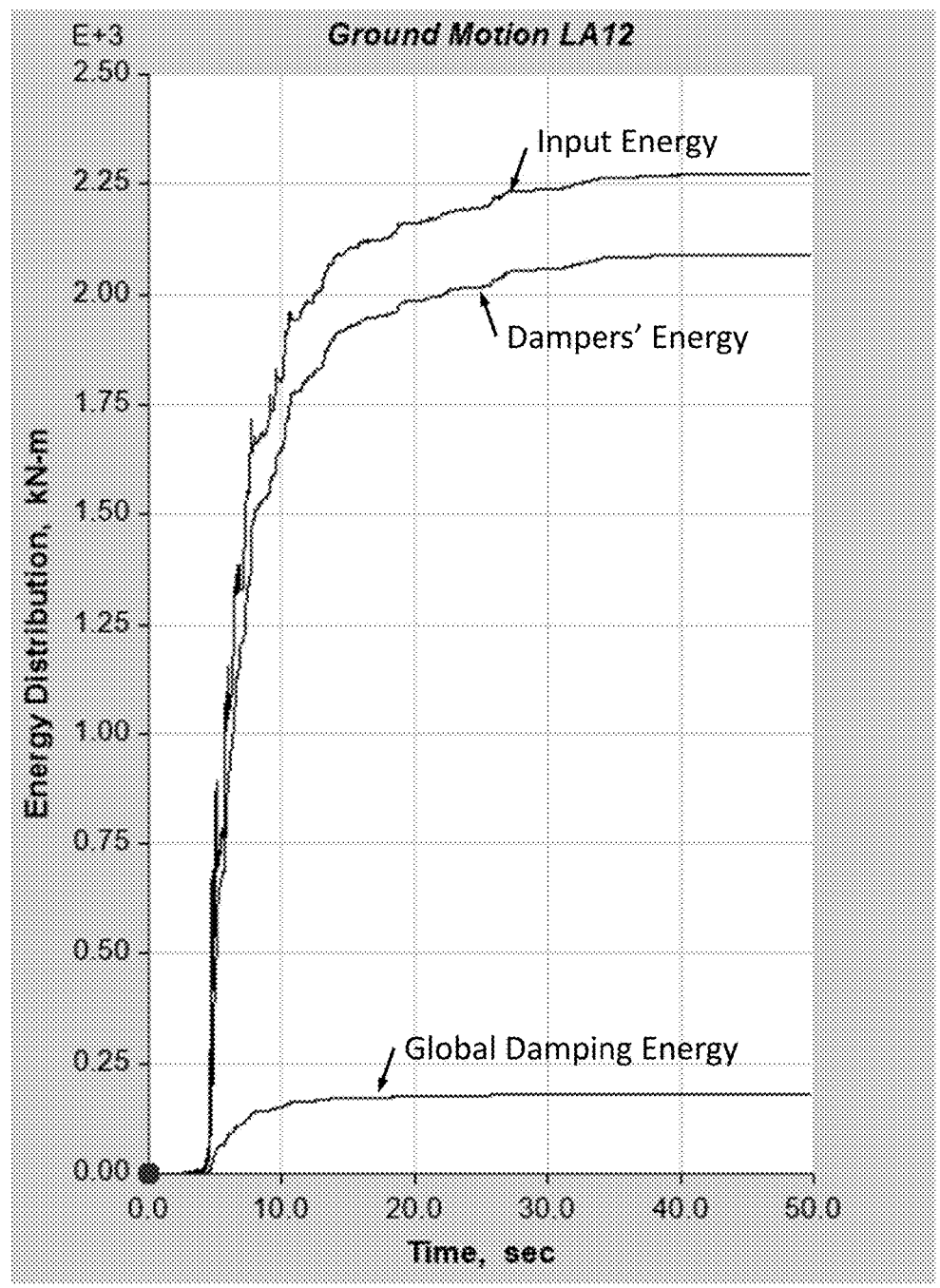
Figure 9G:
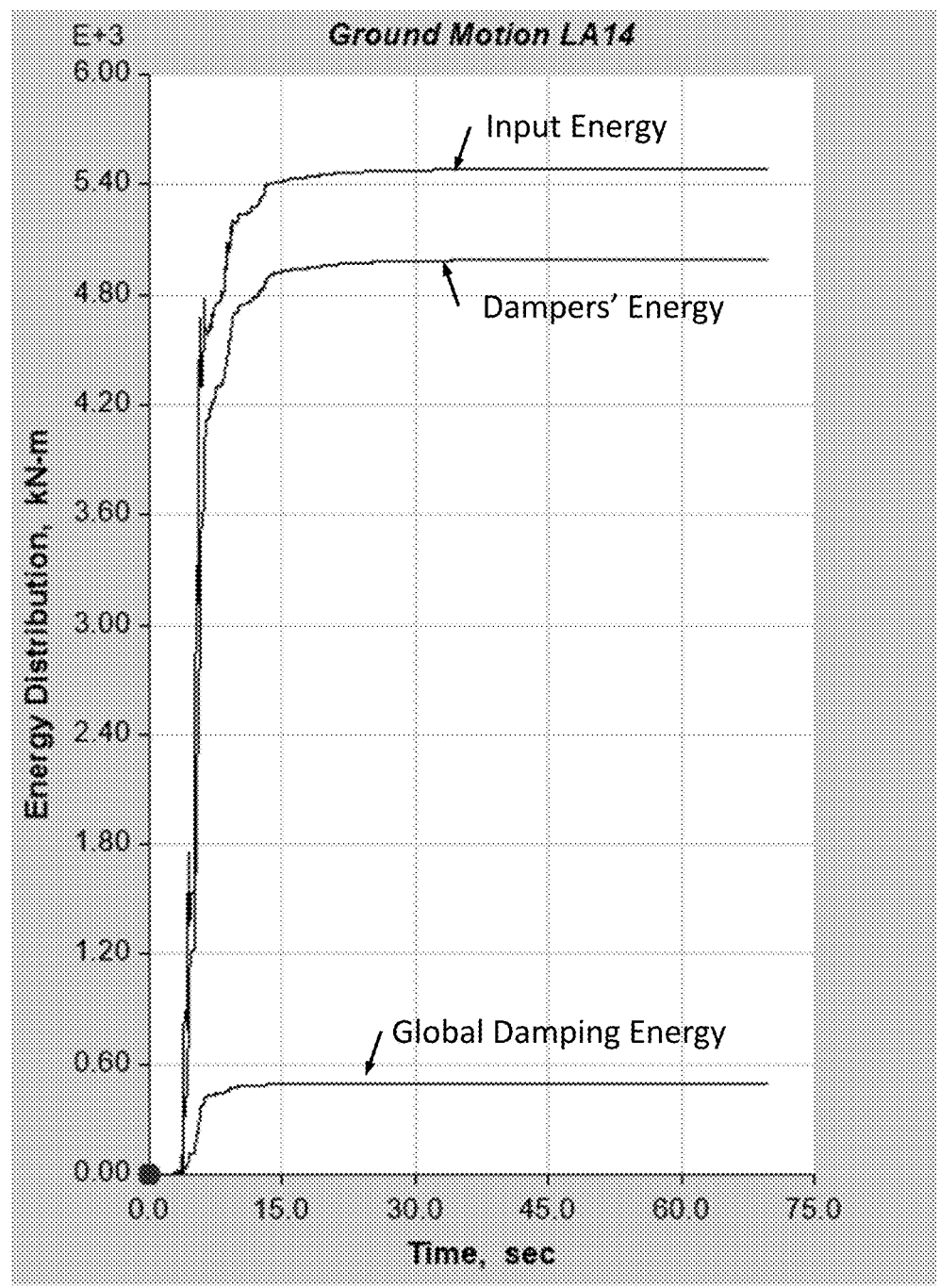
Figure 9H:
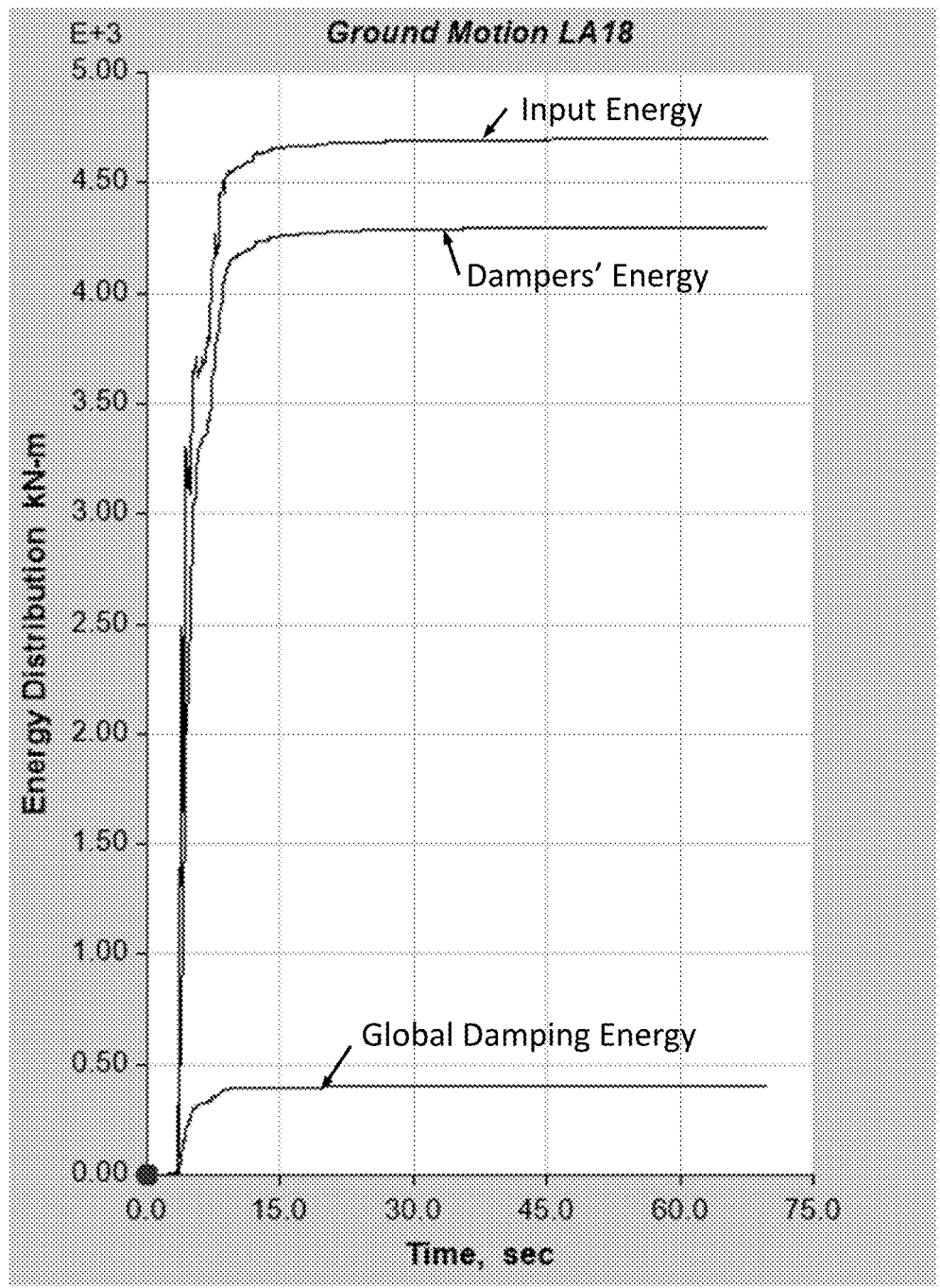

FIGS. 9a through 9i show a hypothetical six story building subjected to five strong design level ground motions. The building has a typical floor plan, dimensioned 36.576 m×21.945 m, with 3.81 m typical story height except at the first floor which is 5.49 m shown in FIG. 9a. The floor dead load is 4.5 kN/m$^2$ and a uniform live load of 3.8 kN/m$^2$ is assumed. Cladding load on the edge beams at floor levels is 6.5 kN/m and at the roof level is 3.25 kN/m. The building is analyzed in the transverse direction and an embodiment of this invention is utilized for the lateral force resisting system as shown in FIG. 9b. The dampers used in this embodiment are of viscous type with damping coefficients of 50 at stories 6 and 5, 80 at stories 4 and 3, and 110 at stories 2 and 1 in the US units of k-in-s. Respectively the damper coefficients are 2909, 4655, and 6400 in SI system of units of kN-m-s. Exponent of velocity is assumed 0.7 for the viscous dampers. Selected ground motions are at design intensity level, for code based design procedures. The Response Spectrum curves of the ground motions are provided in FIG. 9c which shows the intensity level of the shaking. All beam-to-column connections are considered pinned connections. The system is stabilized by usage of undamped diagonal and continuity of the flexural beams, eliminating the need for moment connections or other bracing. This is a significant cost savings achieved by using this system. Significant level of energy absorption is depicted in FIGS. 9d to 9h. In FIG. 9i summary of results are provided. The building shows horizontal acceleration at roof which is lower or close to the ground acceleration. Importance of acceleration is in damages to non-structural elements. Reduction in the base shear is included as well as the equivalent damping which is about 40% in average. All flexural beams used in the lateral system performed in the elastic range while nonlinear deformations are commonly accepted by building code seismic design procedures. This indicates a significant performance improvement that can lower the cost and increase safety of building structures to resist seismic ground shakings.

In this disclosure the stiffness of the lateral load resisting system at every story is time-dependent and varies as a function of damper displacements (assuming displacement activated dampers). Therefore the stiffness at different levels varies with damper functionality. However, when all dampers are removed from the structure it is a relatively soft structural system and when dampers are present its stiffness is as high as a braced system. This system of stiffness variation as implemented in this disclosure leads to the elimination of the need for moment connections or conventional bracing in steel structures as well as mechanical amplification elements. In fact, the system provides lateral stiffness by bending in the flexural members with reduced spans as well as amplification of displacements in dampers that are achieved by usage of rigid substructures.

The structural system described in this disclosure has been examined using different mathematical models subjected to different strong ground motions. All numerical results indicate a high level of energy absorption by dampers and improvement of performance indicators to the extent that achieving an elastic structural response seems to be feasible. It should be noted that the performance goal for most buildings is at Collapse Prevention level which means acceptance of nonlinear deformations, material degradation and some damage to structural and nonstructural elements. Therefore being able to design a building to behave elastically using this system is a major advancement.

While the above description contains many specificities, these should not be construed as limitations on the scope, but rather as an exemplification of several embodiments thereof. Many other variations are possible. For example, one may utilize a three dimensional rigid substructure that includes more than one restrained column provided that the rigid substructure would be turn-able due to the structural drift with some active nodes that can be connected to one or more damped diagonals that are connected to more than one anchor columns and the flexural members may be connected to such three dimensional rigid substructure in any way that can restore the structure to its laterally unloaded position. Accordingly, the scope should be determined not by the embodiments illustrated but by the appended claims and their legal equivalents.

What is claimed is:

1. A passively damped building structure comprising:
    a restrained column;
    an anchor column;
    at least a first and a second floor-beam where each floor-beam is connected from one side to the restrained column and from another side to the anchor column;
    a rigid two dimensional sub-structure, two corners of which are two connection points of the first and the second floor-beams with the restrained column, and a third corner of which is a nodal point C on the first, the second, or a third floor-beam, wherein the nodal point C is located between the restrained and the anchor column;
    a one dimensional damping element that connects the nodal point C to a connection point of the anchor column with a floor-beam on which the nodal point C does not lie; wherein the damping element absorbs an energy deposited by the lateral forces into the elastically deformed structure; and
    wherein the passively damped building structure only has two columns, the restrained column and the anchor column.

2. The building structure of claim 1, wherein the first floor-beam and the second floor-beam are not consecutive floor-beams and may span a few floors.

3. The building structure of claim 1, wherein the one dimensional damping element and the rigid substructure lie in two different planes that intersect.

4. The building structure of claim 1, wherein the rigid substructure is a concrete wall.

5. The building structure of claim 1, wherein the floor-beams are concrete slabs.

6. A damped-motion structure comprising:
    a first column;
    a second column;
    multiple floor-beams where each floor-beam is connected from one side to the first column and from another side to the second column;
    a two-dimensional multi-sided rigid substructure a side of which is a part of the first column and a corner of which, called nodal point, is over one of the floor-beams between the two columns;
    a one dimensional damping element that connects the nodal point to a connection point of the second column with a floor-beam on which the nodal point does not lie; wherein the damping element absorbs an energy deposited by the lateral forces into the elastically deformed structure; and
    wherein the damped-motion structure only has two columns, the first column and the second column.

7. The building structure of claim 6, wherein the one dimensional damping element and the rigid substructure lie in two different planes that intersect.

8. The building structure of claim 6, wherein the rigid substructure is a concrete wall.

9. The building structure of claim 6, wherein the floor-beams are concrete slabs.

\* \* \* \* \*